United States Patent [19]

Mitsuya

[11] 4,143,473
[45] Mar. 13, 1979

[54] MEMORIZING AID
[75] Inventor: Yoshihide Mitsuya, Osaka, Japan
[73] Assignee: Sakura Color Products Corporation, Osaka, Japan
[21] Appl. No.: 818,930
[22] Filed: Jul. 25, 1977
[30] Foreign Application Priority Data Aug. 10, 1976 [JP] Japan .................................. 51-96639

[51] Int. Cl.² .............................................. G09B 1/24
[52] U.S. Cl. ...................................... 35/76; 35/35 G; 74/577 M
[58] Field of Search ............ 35/31 A, 35 G, 76, 31 E; 74/577 M; 40/512, 524, 525; 235/71 R, 86, 91 A

[56] References Cited

U.S. PATENT DOCUMENTS

| | | | |
|---|---|---|---|
| 1,860,483 | 5/1932 | Sewall | 35/76 |
| 2,840,926 | 7/1958 | Campbell | 35/76 F |
| 3,272,431 | 9/1966 | Dablo | 35/31 E X |
| 3,392,460 | 7/1968 | Schure | 35/9 F |
| 3,544,748 | 12/1970 | Schwab | 74/577 M X |
| 3,696,526 | 10/1972 | Roeder | 35/9 E |
| 3,735,502 | 5/1973 | Horine | 35/9 A |
| 3,818,611 | 6/1974 | Young | 35/9 F |

FOREIGN PATENT DOCUMENTS 1273215  8/1961  France ..................................... 35/35 G

*Primary Examiner*—Harland S. Skogquist
*Attorney, Agent, or Firm*—Wenderoth, Lind & Ponack

[57] ABSTRACT

A memorizing aid convenient to memorize foreign words includes an endless tape passing around two rolls and intermittently rotated by pressing a pushbutton. The tape bears information to be memorized, the information being seen through a pair of windows formed in a casing.

3 Claims, 8 Drawing Figures

FIG. 7
FIG. 8
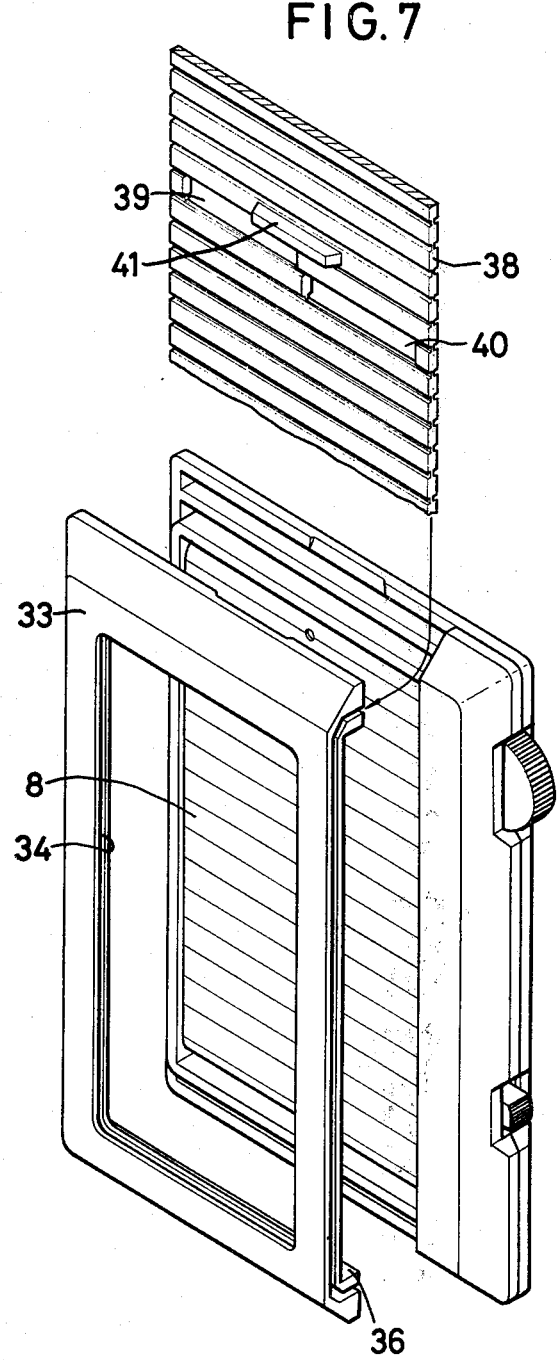
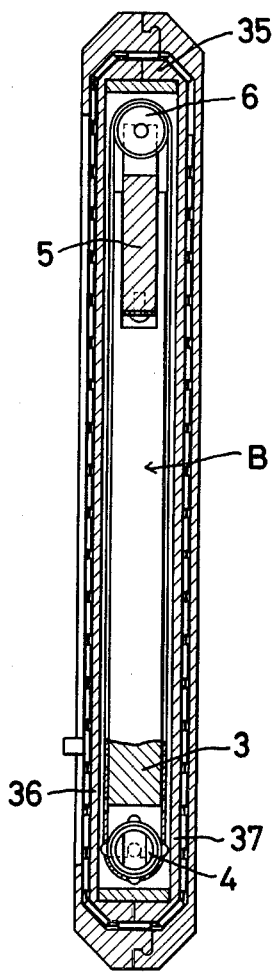

MEMORIZING AID

BACKGROUND OF THE INVENTION

This invention relates to a memorizing aid and, more particularly, an improved aid convenient for use in memorizing, e.g., foreign words.

A known conventional aid or tool of this kind is a card holder containing a pile of cards bearing words and adapted to move one card after another to a memory station. Such a conventional aid has disadvantages that the cards are liable to be damaged, that failure often occurs because the cards are engaged by a pick-up member, and that the casing is rather bulky as the cards are piled.

SUMMARY OF THE INVENTION

An object of the present invention is to provide a memorizing aid which is compact in size, light in weight and handy to carry and which causes hardly any damage to the cards or malfunctions.

BRIEF DESCRIPTION OF THE DRAWINGS

Other features and advantages of the present invention will become apparent from the following description with reference to the accompanying drawings, wherein:

FIG. 3 is a vertical sectional side view thereof taken along the line III—III in FIG. 2;

FIG. 4 is a sectional view thereof taken along the line IV—IV in FIG. 2;

FIG. 7 is an exploded perspective view of the memorizing aid with a quick-feed device according to the present invention, and FIG. 8 is a vertical sectional view thereof.

DETAILED DESCRIPTION OF THE INVENTION

Figure 1:
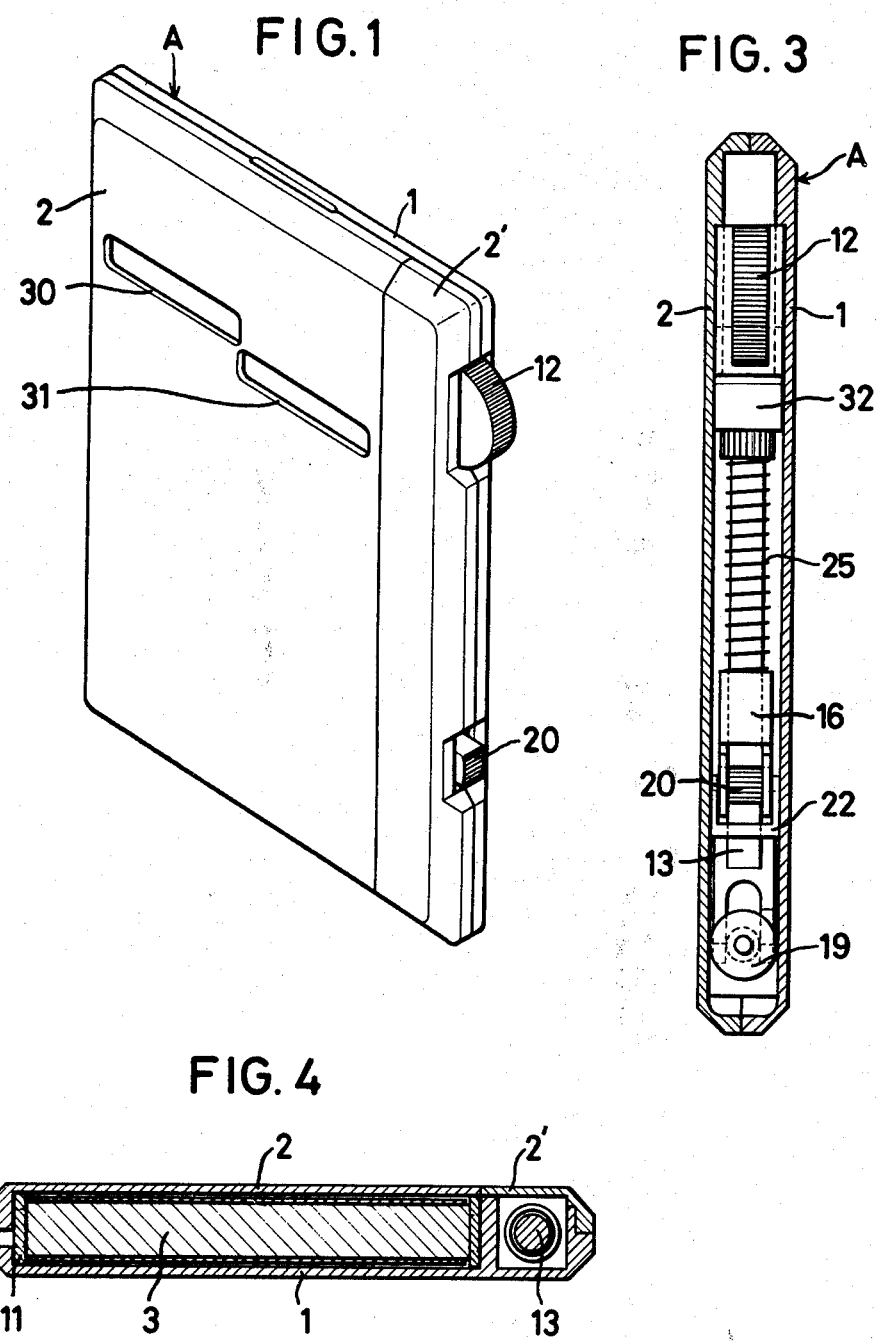
FIG. 1 is a perspective view of the memorizing aid according to the present invention.

Referring to the drawings, the letter A generally designates a flat casing including a bottom half 1, a removable cover 2 for a cassette chamber 42, and a fixed cover 2' for a drive unit chamber 21.

The letter B generally designates a tape cassette adapted to be set in the chamber 42. Cassette B includes a base plate 3, a driving roll 4 rotatably mounted on the base plate at one end of base plate 3, a retractable frame 5 retractably mounted in a recess formed in the other end of base plate 3 and outwardly biassed by a spring 7, an idle roll 6 rotatably mounted on the outer end of retractable frame 5, an endless tape 8, as of paper or synthetic paper, mounted around the driving roll 4 and the idle roll 6, and a rectangular outer frame 11 of an elastic material removably mounted so as to surround the base plate 3.

The driving roll 4 is provided on the periphery thereof with sprockets 10 so as to engage perforations 9 in the endless tape 8. The base plate 3 is provided on each side thereof with projections (not shown) so as to fit in holes in the outer frame 11 to be supported in position.

The letter C generally designates a drive unit mounted in the drive unit chamber 21 and includes a pushbutton 12, a guide member 32, a reciprocating member 13 having a bifurcated end with two pawls 14 and 15 at its lower end, a rocking piece 16 slidably mounted on the member 13, a selector member 20 and a rotor 19 carrying two ratchet wheels 17 and 18. The pushbutton 12 protrudes out of a slit formed in one side of the casing A, and rests on an inclined abutment surface of the guide member 32 into which a pointed upper end of the reciprocating member 13 extends. When the pushbutton 12 is pressed in, the member 13 is pushed down by the guide member 32. A spring 25 is mounted on the reciprocating member 13 between the guide member 32 and the rocking piece 16 to urge the guide member 32 against the pushbutton 12.

The selector member 20 has a knob projecting out of a slit in the side of casing A and is mounted on a stationary support 22 to be rockable about a pin 23. The reciprocating member 13 extends through the rocking piece 16, selector member 20, and stationary support 22 to be reciprocatable and rockable. The rocking piece 16 has at its lower end two projections 26 engaging notches 24 in the selector member 20. When the knob of selector member 20 is turned up and down, the rocking piece 16 oscillates leftward and rightwardly, respectively. Between the ratchet wheels 17 and 18, there is provided a sufficient spacing 27 to provide a neutral position. The rotor 19 is provided at one end thereof with a square shaft 28 at its one end adapted to removably fit in a notch in the righthand end, as viewed in the drawings, of the driving roll 4.

The cover 2 is formed with a pair of windows 30 and 31 arranged side by side but shifted with respect to each other in the direction of movement of the tape by a distance equal to as the pitch at which the endless tape 8 moves. A similar pair of windows may be provided in the bottom half 1.

The endless tape 8 usually bears two sets of information, e.g. words corresponding to each other printed, or written in two columns. For example, first units such as Japanese words are in one column and second units such as corresponding English words are in the other column.

Figure 2:
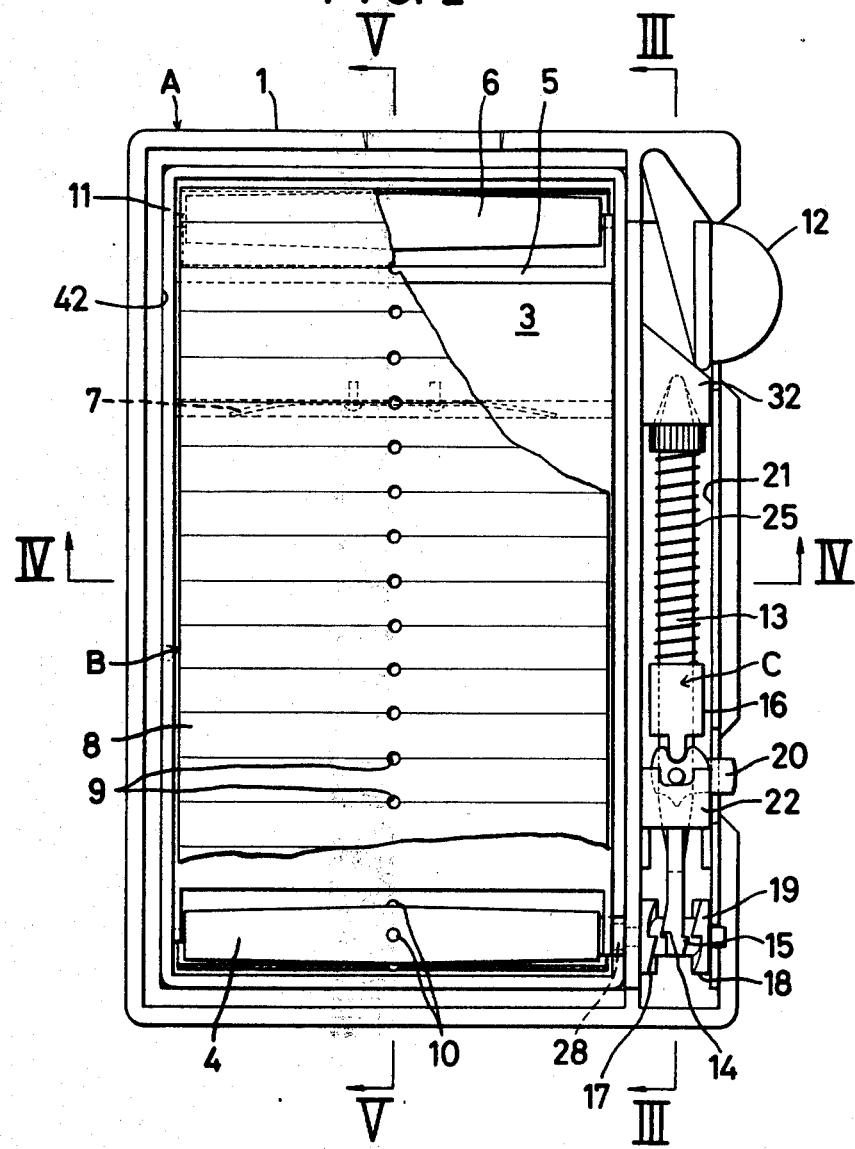
FIG. 2 is a partially cutaway front view thereof with the cover removed and the selector member in its neutral position.
Figure 5:
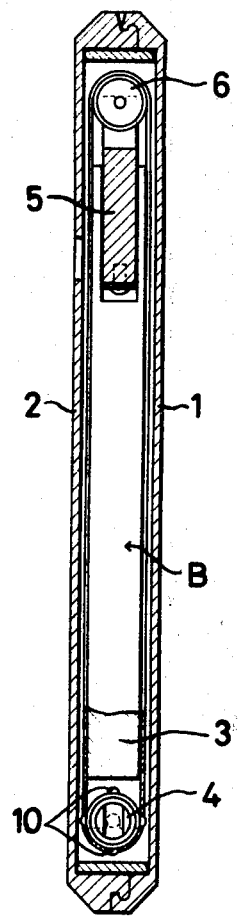
FIG. 5 is a vertical sectional view thereof taken along the line V—V in FIG. 2.
Figure 6:
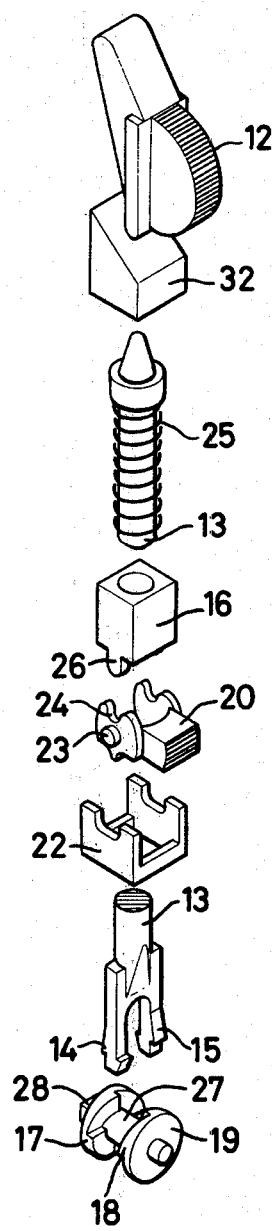
FIG. 6 is an exploded view of the drive mechanism.

In operation, when the selector member 20 is in its neutral position as illustrated in FIG. 2, neither of pawl 14 or 15 engages the respective ratchet wheels 17 or 18, even when the pushbutton 12 is pressed and released. Thus, the rotor 19 and the driving roll 4 will not rotate.

When the selector member 20 is turned upwardly, it causes the rocking member 16 and the reciprocating member 13 to rock to the left as viewed in the drawings, thus putting the pawl 14 into engagement with the ratchet wheel 17 for normal rotation. In this condition, each time the pushbutton 12 is pressed and released to move the reciprocating member 13 down and up, the rotor 19 and thus the driving roll 4 rotate in a normal direction, moving the tape 8 downwardly by one pitch, as viewed through windows 30 and 31. When the selector member 20 is turned downwardly, the pawl 15 is brought into engagement with the ratchet wheel 18 for rotation in the reverse direction. Pressing and releasing the pushbutton 12 rotates the driving roll 4 in the reverse direction, thus moving the tape 8 upwardly as viewed through windows 30 and 31.

FIGS. 7 and 8 show another embodiment of the memorizing aid which is provided with a quick-feed device. In this embodiment, the cover 33 for the cassette chamber is formed with a wide rectangular opening 34. A window member 38 in the form of a caterpillar-type element is mounted to be slidable between the casing A and a window support 35 which is mounted to enclose the cassette B and which includes a pair of halves 36 and 37. The upper half 36 is formed with a wide rectangular opening as is the casing 33. The window member 38 is formed with a pair of windows 39 and 40 similar to those in the cover 2 of the embodiment of FIGS. 1–6, and is provided with a knob 41 with which to slide member 38 over the tape 8 to a desired position.

As mentioned above, each time the pushbutton 12 is pressed and released, the endless tape 8 bearing the information to be memorized moves by one pitch in the normal or reverse direction. Let us assume that English words are in the left-hand column on the tape and Japanese words corresponding thereto in the right-hand column. The Japanese word corresponding to the English word now in one window 30 will appear in the other window 31 by moving the tape 8 by one pitch in the normal direction. This enables a student to use this aid to memorize the Japanese words corresponding to a series of English words. When the knob of selector member 20 is turned downwardly for reverse travel, this aid can also be used to memorize the English words corresponding to a series of Japanese words.

Alternatively, a single window may be provided and two kinds of words (e.g. English and Japanese words) may be adapted to appear therein alternately. Alternatively, a single window may be provided and each pair of corresponding words may be printed not in the same line but in different lines next to each other.

The idle roll 6 may be omitted and the endless tape 8 may be adapted to pass around the driving roll 4 and an opposite rounded end of the base plate 3. Also, the idle roll 6 may be replaced by a fixed shaft. Alternatively, the endless tape 8 may be passed around three or more rolls, instead of two, to use a longer tape to increase the data capacity thereof.

The use of the quick-feed device in FIGS. 7 and 8 permits a quick movement of the window member 38 to a desired data position instead of moving the tape by pressing the pushbutton 12.

It is to be understood that various changes or variations may be made without departing from the scope of the present invention.

What is claimed is:

1. A memorizing aid comprising:
   a casing having at least one viewing opening in at least one surface thereof;
   a base plate removably mounted within said casing by a frame;
   an endless tape mounted about said base plate and extending over spaced opposite ends thereof, said endless tape having thereon information to be memorized, said information being arranged in units spaced along the endless length of said endless tape;
   a drive roller rotatably mounted at one of said ends of said base plate, said drive roller being in engagement with said endless tape, such that rotation of said drive roller causes said endless tape to move about said base plate; and
   means for selectively intermittently rotating said drive roller in opposite directions, and for thereby selectively intermittently moving said endless tape in opposite directions about said base plate, by an amount equal to the spacing between adjacent said units of information on said endless tape, whereby a selected said unit of information on said endless tape is selectively positioned to be visible through said at least one viewing opening in said casing, said rotating means comprising a selectively operable pushbutton, an elongated reciprocating member having a first end adjacent said pushbutton, said reciprocating member adapted to be axially reciprocated upon operation of said pushbutton, a rotor fixed to said drive roller, said rotor including first and second oppositely directed ratchet wheels spaced from each other axially of said drive roller, a second end of said reciprocating member being bifurcated and having first and second pawls selectively engageable with said first and second ratchet wheels, respectively, a selector member connected to said reciprocating member and selectively movable between a first position, whereat said reciprocating member is laterally displaced in a direction axially of said drive roller such that said first pawl engages said first ratchet wheel upon selective operation of said pushbutton and axial reciprocation of said reciprocating member to thereby rotate said drive roller and move said endless tape in a first direction, and a second position, whereat said reciprocating member is laterally displaced in a direction axially of said drive roller such that said second pawl engages said second ratchet wheel upon selective operation of said pushbutton and axial reciprocation of said reciprocating member to thereby rotate said drive roller and move said endless tape in a second direction opposite to said first direction.

2. A memorizing aid as claimed in claim 1, wherein said units of information are arranged in first and second laterally spaced columns extending along said endless length of said endless tape, and said casing has therein first and second laterally spaced viewing openings for viewing information of said first and second columns, respectively, said first and second viewing openings being displaced with respect to each other in the direction of said columns by a distance equal to said spacing between adjacent said units of information.

3. A memorizing aid as claimed in claim 1, further comprising a guide member connected to said first end of said reciprocating member, said guide member having an abutment surface which is inclined to the axial dimension of said reciprocating member, and spring means for urging said reciprocating member and said guide member toward said pushbutton, such that said abutment surface is maintained in contact with said pushbutton.

* * * * *